United States Patent
Lohberg et al.

(10) Patent No.: US 7,207,423 B2
(45) Date of Patent: Apr. 24, 2007

(54) ACCELERATION SENSOR FOR MOTOR VEHICLES

(75) Inventors: Peter Lohberg, Friedrichsdorf (DE); Michael Zydek, Frankfurt (DE); Wolfgang Ziebart, Frankfurt am Main (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 112 days.

(21) Appl. No.: 10/491,734

(22) PCT Filed: Sep. 13, 2002

(86) PCT No.: PCT/EP02/10292

§ 371 (c)(1),
(2), (4) Date: Sep. 2, 2004

(87) PCT Pub. No.: WO03/031992

PCT Pub. Date: Apr. 17, 2003

(65) Prior Publication Data

US 2006/0086577 A1 Apr. 27, 2006

(30) Foreign Application Priority Data

Oct. 5, 2001 (DE) ................ 101 49 247
Jan. 11, 2002 (DE) ................ 102 01 026

(51) Int. Cl.
*F16D 66/00* (2006.01)

(52) U.S. Cl. ............... 188/1.11 E; 340/467; 73/494; 73/516.16

(58) Field of Classification Search .......... 188/1.11 E; 340/439, 467 X, 466, 562, 467; 73/488, 73/493, 494 X, 514.01, 514.03, 514.16 X, 73/514.25, 514.32, 514.35, 514.36, 494, 73/514.16

See application file for complete search history.

(56) References Cited

U.S. PATENT DOCUMENTS

| | | | |
|---|---|---|---|
| 3,569,747 A | | 3/1971 | Siegel |
| 5,353,641 A | * | 10/1994 | Tang ..................... 73/514.18 |
| 5,417,312 A | * | 5/1995 | Tsuchitani et al. ...... 188/181 A |
| 5,541,437 A | * | 7/1996 | Watanabe et al. ........... 257/417 |
| 5,821,419 A | * | 10/1998 | Mader et al. ................. 73/493 |
| 5,960,376 A | * | 9/1999 | Yamakado et al. ......... 702/141 |
| 6,286,895 B1 | * | 9/2001 | Urushiyama et al. .. 296/187.03 |

FOREIGN PATENT DOCUMENTS

| | | |
|---|---|---|
| DE | 19634715 | 3/1998 |
| DE | 19705365 | 8/1998 |
| DE | 19909535 | 9/2000 |
| DE | 19961299 | 6/2001 |
| DE | 10012862 | 9/2001 |

* cited by examiner

*Primary Examiner*—Devon Kramer

(57) ABSTRACT

An acceleration sensing unit (1) includes an acceleration sensor element (4), wherein said sensing unit (1) emits an electric signal at a signal output (k3, k4), the sensing unit (1) is electrically active and supplied with electric energy through the signal output.

In an assembly composed of the above-mentioned sensing unit and a control unit, the sensing unit includes at least one signal line (3) connected to control unit (2), with said control unit being in particular an electronic motor vehicle brake control unit, and the control unit (2) transmits the energy for the connected sensing unit(s) (1) by way of the signal lines (3).

6 Claims, 7 Drawing Sheets

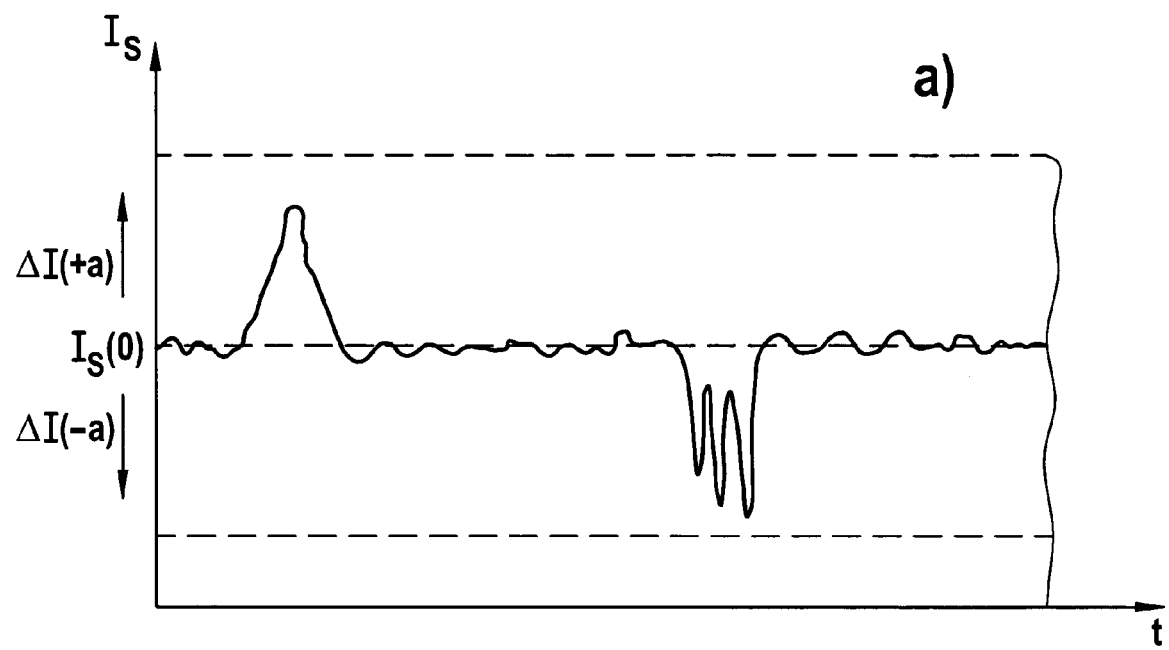
Fig. 3
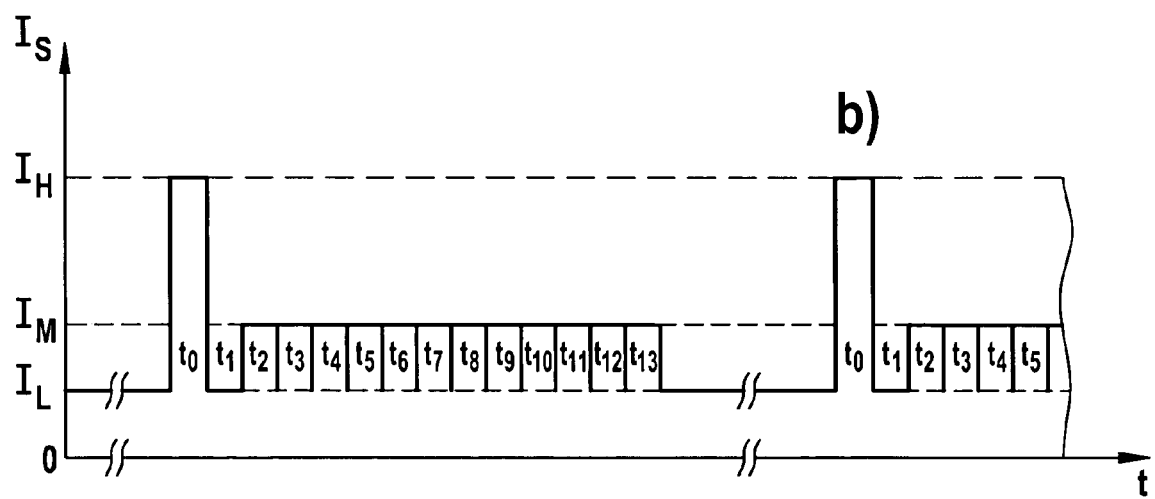

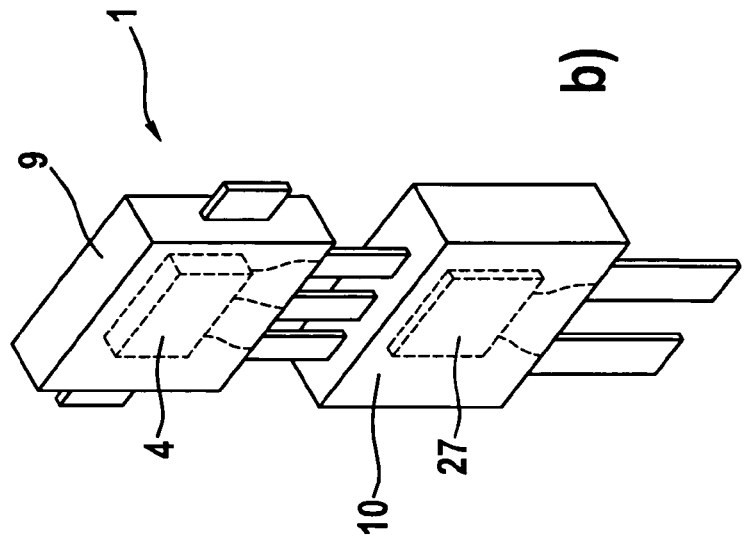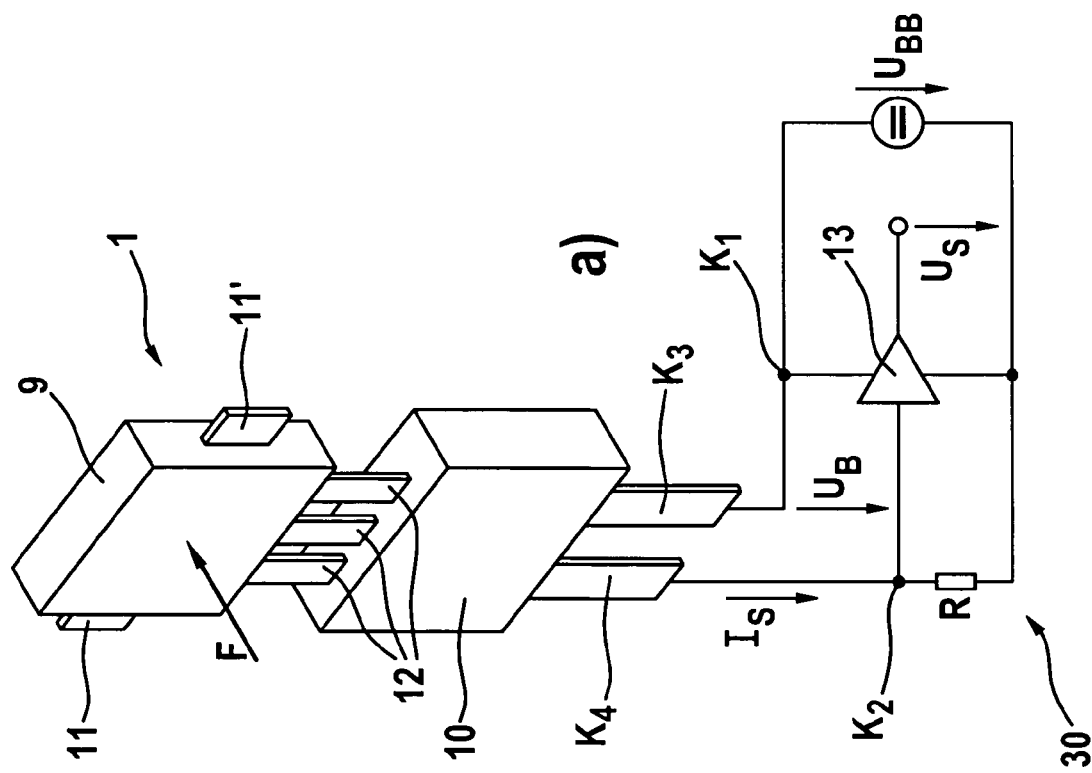
Fig. 4

ACCELERATION SENSOR FOR MOTOR VEHICLES

BACKGROUND OF THE INVENTION

The present invention relates to an acceleration sensing unit including an acceleration sensor element emitting an electric signal at a signal output and an assembly including such a sensing unit and a control unit.

For the precise magnetic detection of the rotational speed of a wheel in electronic motor vehicle brake systems, high-quality wheel speed sensor modules in chip technology are required, as they are described in German patent application P 44 45 120 (P 7805) or in DE-A-199 226 72 (P 9641). The wheel speed sensor modules described comprise a magneto-resistive element used to scan the magnetic field of a magnetic encoder rotating with the wheel. The modules are electrically active, with the result that the detected wheel speed data can be transmitted by way of a current interface to an integrated brake control unit in a fashion that is largely irrespective of the air slot.

DE-A-38 09 886 discloses a combination sensor for detecting the wheel speed and accelerations, wherein the necessary sensors are grouped in one joint uniform housing. The rotational speed sensor element incorporated in the combination sensor is an inductive or magneto-resistive transducer. The acceleration sensor has an inert precise mechanical mass whose movement indicates the prevailing acceleration. The sensor data is transmitted by way of a multi-core line that can be used jointly by both sensors. Consequently, the combination sensor described is no active sensor wherein the electric energy required by the sensor for operation is provided by a control unit intended to receive the signals by way of the signal lines.

An object of the present invention is to provide a sensing unit for detecting accelerations that is improved structurally, electrically and under signal technology aspects and optimized for the rough operation in the motor vehicle, while allowing low-cost manufacture in addition.

SUMMARY OF THE INVENTION

This object is achieved by an acceleration sensing unit which is electrically active and supplied with electric energy through the signal output.

According to a preferred embodiment of the invention, the acceleration sensing unit of the invention is linked to a per se known wheel speed sensor, with this linking being preferably effected in a joint device that can be fixed mechanically to a joint mounting support, e.g. to the wheel axle. This arrangement is advantageous because it renders possible a joint use of the interface to the control device and the necessary current supply in addition to low-cost manufacture.

The sensing unit of the invention can be used to detect the axle acceleration and emergency accelerations for airbag systems or also for detecting the vehicle acceleration for ESP systems. Another possibility of use involves improving the detection of the current vehicle condition in an electronic control unit by additional sensed data. Thus, e.g. the vehicle speed of locking wheels can be detected with enhanced reliability. Further, the sensed data of the sensor of the invention can be used in actively controlled damper systems. The acceleration sensing unit of the invention favorably allows the use of processing equipment and tools already provided for the production of wheel rotational speed sensors.

In another preferred embodiment of the sensing unit, said sensing unit is configured as a double or multiple sensor so that it additionally comprises—apart from one or more acceleration sensor elements—at least one further sensor element for detecting another physical quantity such as magnetic field, temperature, pressure, yaw rate, etc. In a particularly preferred manner, the double or multiple sensor additionally senses in a per se known manner the wheel rotational speed by means of a magnetic-field-sensitive element. A suitable sensor with a magneto-resistive sensor element, which is used in a particularly preferred manner, is described in WO 98/09173.

The additional sensor data is appropriately transmitted jointly with the acceleration data by way of the two-core connection provided for the acceleration sensing unit.

The acceleration sensing unit according to the invention with slight modifications may be employed preferably as an impact sound microphone, for example, for sensing vibrations of the tires and the chassis.

Furthermore, the invention relates to an assembly of a sensing unit and a control unit according to claim 9.

Further details can be taken from the following description of an embodiment by way of Figures.

BRIEF DESCRIPTION OF THE DRAWINGS

In the drawings,

FIG. 3 shows diagrams representing the output marking currents of the sensing unit.

FIG. 4 is a view of a housed sensing unit and its electrical wiring.

DETAILED DESCRIPTION OF THE DRAWINGS

Figure 1:
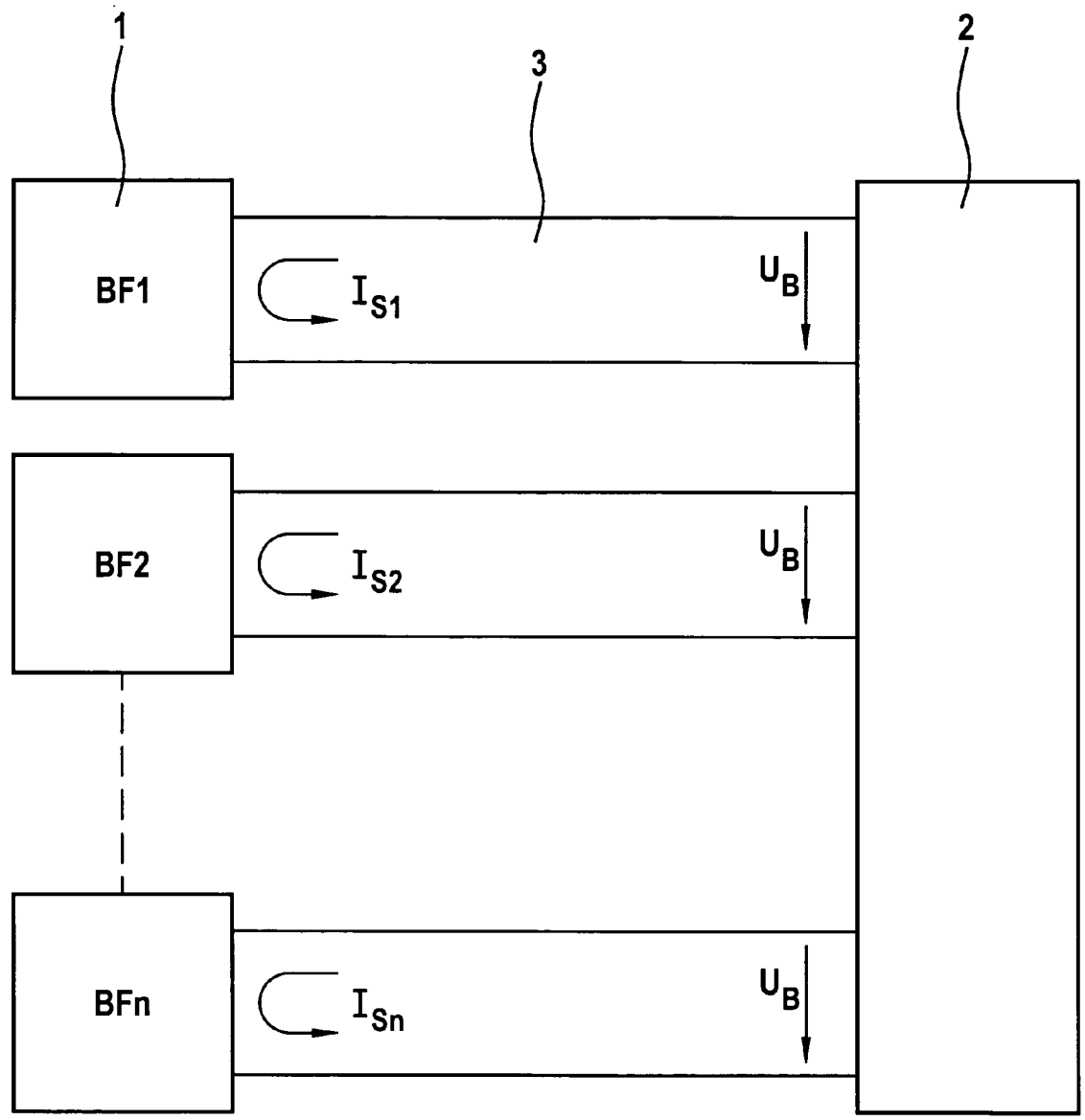
FIG. 1 is a schematic view of the arrangement of the invention.

In FIG. 1 at least one acceleration sensing unit 1 is connected to a control unit 2 by way of a two-core connection 3 for signal exchange purposes. Control unit 2 supplies electric energy for the supply of the sensing unit(s) by way of operating voltages $U_B$ applied to the respective two-wire lines. The marking currents $I_{S1}$, $I_{S2}$, $I_{S3}$ are modulated through connecting lines 3 in response to the sensor signals. The modulated marking currents may then be converted into appropriate digital signals for an arithmetic unit in the control unit.

Figure 2:
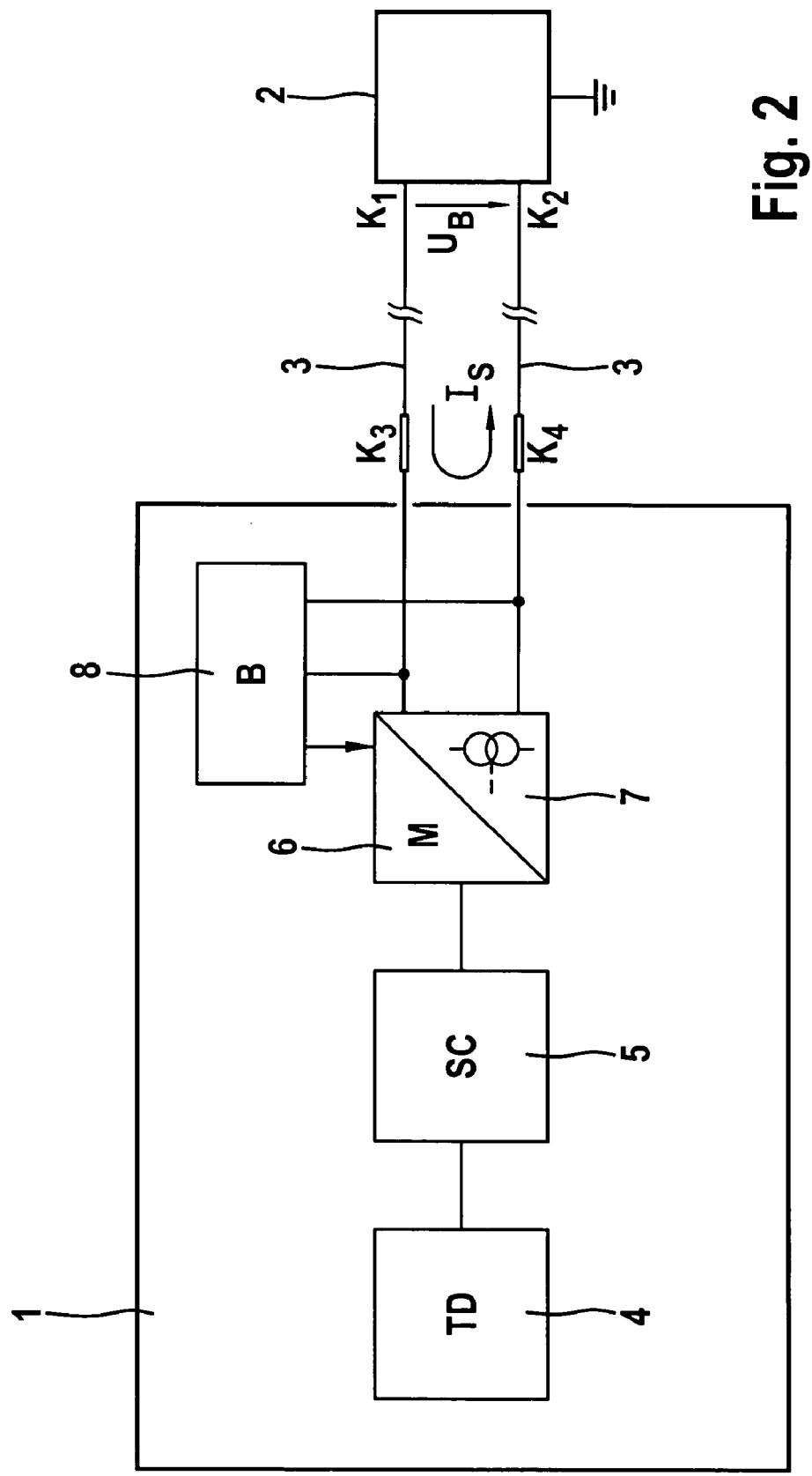
FIG. 2 is a basic view of a sensing unit of the invention that is connected to a control unit.

FIG. 2 shows a detailed diagrammatic view of an acceleration sensing unit 1 of the invention. An acceleration sensor 4 is comprised therein that generates an acceleration-responsive electric signal (variation of the resistance, capacitance, voltage, inductance, etc.). Sensor 4, for example, is a micro-mechanical electromechanical converter which, in reaction to forces applied, causes a change in the bridge voltage of a resistance bridge, or a corresponding change in capacitance, depending on the used sensor principle.

The signal of sensor 4 is acquired by a signal conditioning stage 5, corrected if necessary, and subsequently shaped into a signal pattern associated with the acceleration and sent to a modulator 6 controlling a current source 7 that follows the rhythm of the signal pattern. The above function groups 4 to 8 are structurally combined in a sensor module with the signal output $K_3$, $K_4$. Line 3 connects terminals $K_3$, $K_4$ to terminals $K_1$, $K_2$ of the control unit 2. It is preferred that the current signal produced by the sensing unit is impulse-coded. The marking current is detected in control unit 2, and the signal pattern is interpreted as a sequence of measuring values. Sensing unit 1 further comprises observer stage 8 acting on the sensing unit under signal technology aspects through modulator 6 when a defined pulse pattern of the voltage $U_B$ occurs at terminals $K_3$, $K_4$ that can be generated by the signal receiving unit 2. By means of the above-mentioned defined pulse pattern, the sensor module can be induced to adopt different operating modes and can communicate with the signal receiving unit by way of the interface that is also acted upon by the observer. A defined operating mode of this type may e.g. be configured such that calibration operations are performed. The acceleration signal is transmitted similarly to the principle described in International patent application WO 98/09173.

FIG. 3 shows two examples of signal patterns for transmitting the acceleration data to control unit 2. The marking current I is plotted in the diagrams as a function of time t. In partial image a), the acceleration and direction of acceleration is coded as a positive amplitude deviation $\Delta I(+a)$ and negative amplitude deviation $\Delta I(-a)$ in relation to the marking current $I_s(0)$. $I_s(0)$ is associated with either the acceleration zero or any other comparison value, e.g. the acceleration due to gravity.

In partial image b), the acceleration values are coded digitally as a current pattern which is produced from pulses with three different amplitudes $I_L$, $I_M$ and $I_H$. A marking current of $I_H$ of the duration $t_0$ with subsequent level $I_L$ of duration $t_1$ is used for synchronization with the signal receiving unit. Bit patterns corresponding to the acceleration values are coded into times $t_2$ to $t_{13}$. Herein, 12 bit were chosen as an example, however, this number is not fixed according to the invention.

The written bit patterns can be coded such that a level $I_M$ corresponds to a logical '1' and a level $I_L$ corresponds to a logical '0' (amplitude coding). It is arranged for in a preferred embodiment that the bit information is edge-coded, e.g. according to the principle of the per se known Manchester coding.

The time interval of the signal amplitudes $I_H$ corresponds to the rate of scanning of the measuring operation. Said rate is principally variable by communication of the sensor module with the signal receiving unit by way of the observer stage, however, it is always selected so that a sufficient time interval is maintained between the last data bit (herein $t_{13}$) and the start bit (herein $t_0$).

FIGS. 4a) and 4b) exhibit in a perspective view an acceleration sensing unit 1 composed of two housing units. The first housing unit 9 accommodates acceleration transmitter 4. The electronic unit for signal processing 27 is arranged in a second housing unit 10 connected to housing 1 by way of strip-shaped conductors 12. Housing part 9 has two markings 11 and 11' facilitating the precise positioning into a mold for the later lamination of housings 9 and 10. Contacts $K_3$, $K_4$ likewise configured as strip-shaped conductors and connected to contacts $K_1$, $K_2$ of an electronic service connection, project from housing part 10.

In partial image a), the basic design of an appropriate service connection 30 for sensing unit 1 is shown. Said service connection is supplied with direct current UBB. Sensor module 1 and resistor R form a voltage divider $U_B + I_S * R = U_{BB}$, and the voltage $I_S * R$ is applied to the input of amplifier 13. Signal voltage $U_S$ can be tapped from the output of the amplifier for further electronic processing.

When a force F acts on housing part 9, e.g. in the illustrated direction of arrow F, the sensor element 4 will react to the related acceleration. The integrated circuit 10 will shape an associated marking current pattern.

Figure 5:
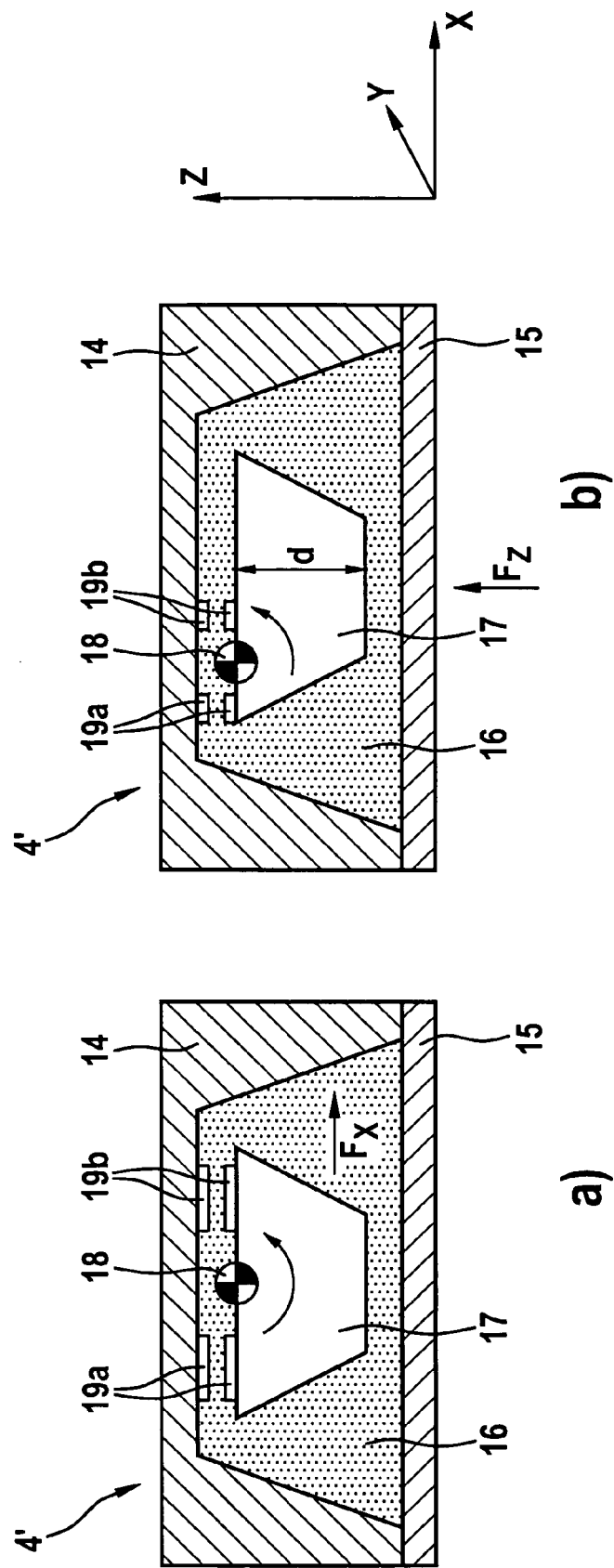
FIG. 5 is a micromechanical acceleration transmitter as employed in the sensing unit of FIGS. 1 to 4.

FIG. 5 depicts a cross-sectional view of examples for acceleration sensor elements 4' that can be used according to the invention and are manufactured in bulk micromechanics. In this method, the desired three-dimensional structures are etched into a massive semiconductor material, especially silicon. Therefore, elements 4' are square-shaped components of an edge length of a few millimeters. They comprise a small semiconductor tub 14 closed by a cover 15. Inside there is a gas 16 for damping the sensor mechanics, composed of semiconductor material 17 and a suspension 18 having resetting properties that correspond to a torsion spring. Electrodes 19a, 19b are fitted in pairs between mass 17 and tub 14. Said electrodes are connected through electric connections a, b, c to an integrated circuit that is preferably arranged in housing 10. When acceleration forces $F_x$ or $F_z$ act on the masses 17, the distances of the electrodes will change pairwise in opposite directions, and hence, the capacitances $\Delta C_1$ and $\Delta C_2$ between the terminals a–b and b–c. In the element according to FIG. 5a, the mass is a symmetric pendulum suspension and reacts in the X-direction or Y-direction, however, not in the Z-direction. As is preferred in the invention, micromechanical acceleration sensors with a measuring range of less than 50 g, especially of roughly 1 g to 2 g, are used.

In the embodiment illustrated in FIG. 5b, the mass of the sensor element has an unsymmetrical suspension and, accordingly, reacts mainly to the Z-component of the acceleration $F_z$. It is expedient in this respect to reduce the thickness d of the mass except for a narrow strip at the level of the center of motion.

Figure 6:
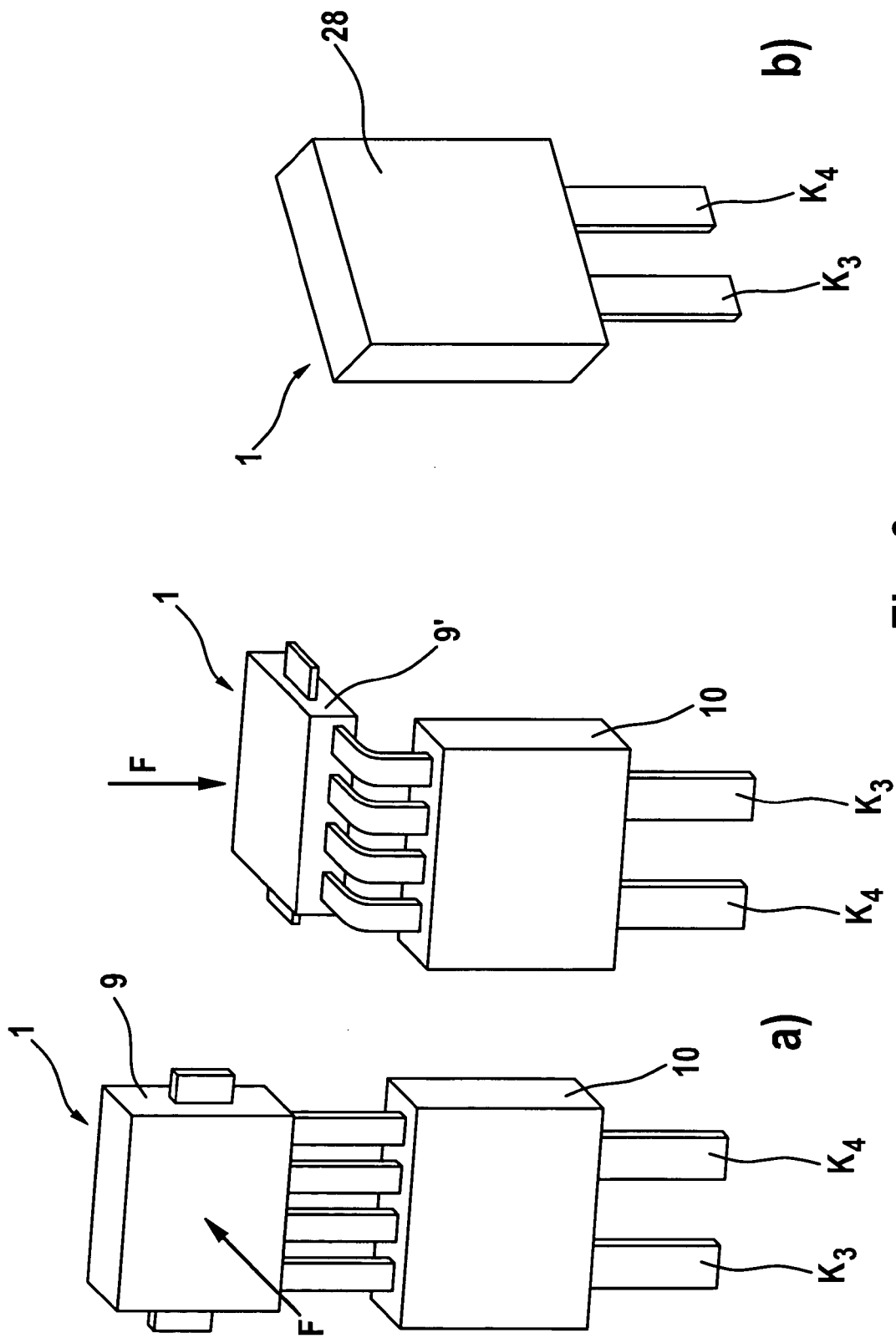
FIG. 6 shows different housing configurations of the sensing unit of the example.

FIG. 6 shows further embodiments of housings for sensing unit 1. FIG. 6a depicts a sensor module wherein the housing parts 9, 10 are not connected by three (FIG. 4) but by four strip-shaped conductors. With these four conductors, a piezoresistive bridge circuit in the housing of the acceleration transmitter is connected to the electronic unit in the housing part 10. The housing compound connected to deflectable conductors renders it possible to adapt the direction of flow of the sensor element in housing part 9' with regard to the assembly direction of the probe to the direction of flow of the force component F. A separate manufacture of housing designs for sensing force components in different directions of flow transferred may thus be favorably omitted.

Partial image b) represents a probe 1 in which the housing elements 9 and 10 were incorporated in one joint housing 28.

Figure 7:
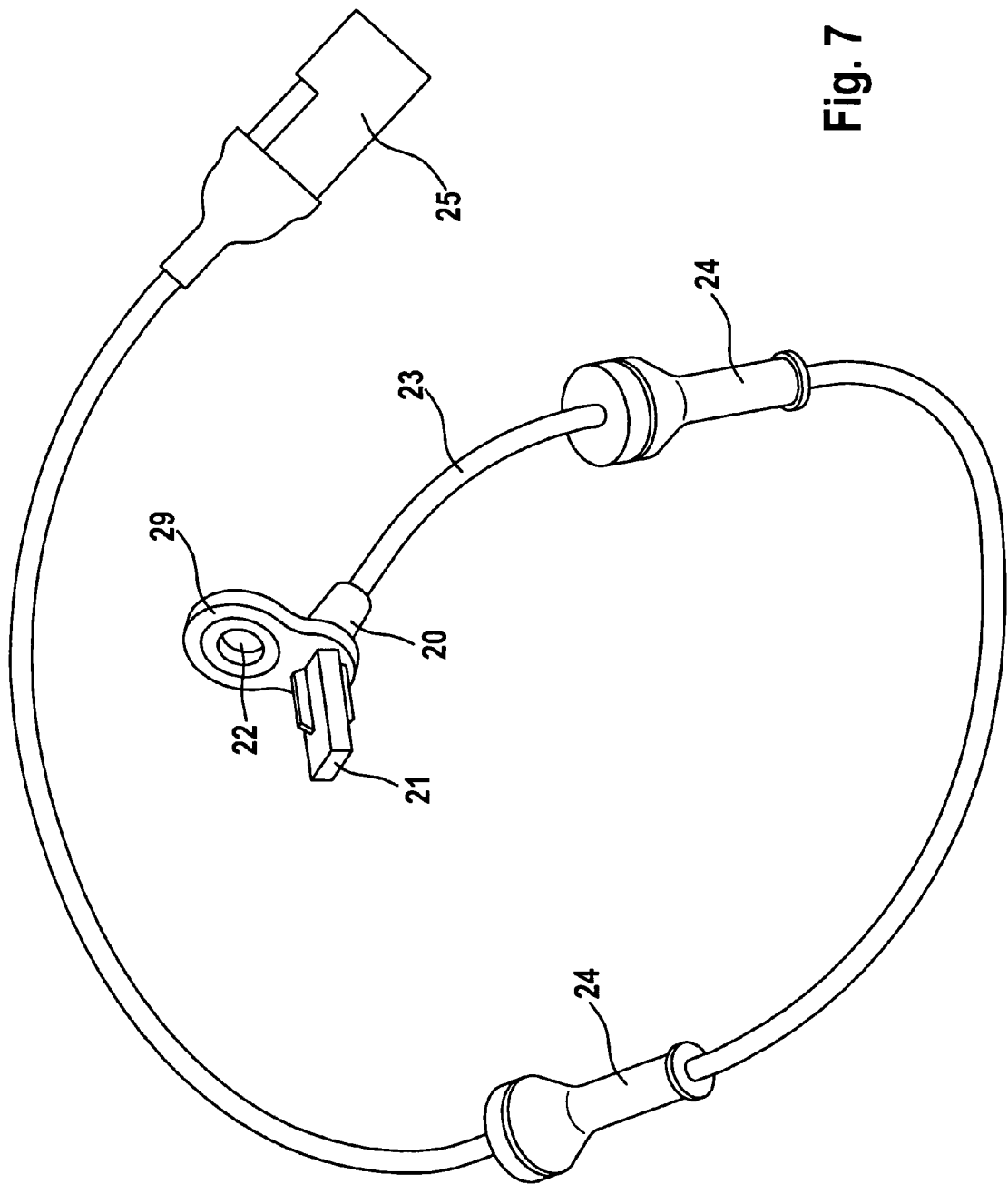
FIG. 7 shows a probe fabricated for a brake system.

In FIG. 7, sensing unit 1 is encompassed by lamination with plastics so that a finger-shaped probe 21 is achieved. This lamination protects the probe against environmental influences (e.g. moisture). The ready-made probe is composed of head 20, a non-twisted two-wire cable 23, and connecting plug 25. Cable 23 includes bushes 24 used to mount the probe. Connected to probe head 20 is a lug 29 that has a fastening sleeve 22 for fastening the probe to the vehicle chassis, e.g. by a screw (not shown).

The invention claimed is:

1. An acceleration sensing unit (1) including an acceleration sensor element (4), wherein said sensing unit (1) emits an electric signal at a signal output (k3, k4), which is connectable to a signal receiving unit (2), wherein the sensing unit (1) is electrically active and supplied with electric energy through the signal output, the acceleration sensing unit including an observer stage (8) and a modulator (6), the observer stage acting on the sensing unit through the modulator (6) when at the signal output a defined pattern occurs that can be generated by the signal receiving unit, the observer stage thus being capable of inducing a calibration in the sensing unit.

2. The sensing unit as claimed in claim 1, wherein the electric signal emitted at the signal output is a current signal in which especially the current amplitude is an indicator of the measured acceleration.

3. The sensing unit as claimed in claim 1, wherein the electric signal emitted at the signal output is a binary coded current signal.

4. The sensing unit as claimed in claim 1, wherein the acceleration sensor element is a micromechanical sensor (4').

5. An assembly comprising at least one sensing unit Including an acceleration sensor element (4), wherein said sensing unit (1) emits an electric signal at a signal output (k3, k4) and is electrically active and supplied with electric energy through the signal output, and the assembly comprising a control unit (2), wherein the sensing unit includes at least one signal line (3) connected to said control unit (2), with said control unit being an electronic brake control unit, and the control unit (2) transmitting energy for the connected at least one sensing unit (1) by way of the at least one signal line (3), wherein the control unit comprises a device for mode switch-over of the at least one sensing unit by way of the at least one signal line (3) and the acceleration sensing unit including an observer stage (8) and a modulator (6), the observer stage acting on the sensing unit through the modulator (6) when at the signal output a defined pattern occurs that can be generated by the control unit (2).

6. The assembly as claimed in claim 5, wherein the observer stage is capable of inducing a calibration in the sensing unit upon observing a corresponding pattern from the control unit.

* * * * *